(12) United States Patent
Malig et al.

(10) Patent No.: US 7,840,298 B2
(45) Date of Patent: Nov. 23, 2010

(54) METHOD AND SYSTEM FOR ADVANCED PROCESS CONTROL USING MEASUREMENT UNCERTAINTY AS CONTROL INPUT

(75) Inventors: Hans-Juergen Malig, Dresden (DE); James Broc Stirton, Dresden (DE)

(73) Assignee: Advanced Micro Devices, Inc., Austin, TX (US)

( * ) Notice: Subject to any disclaimer, the term of this patent is extended or adjusted under 35 U.S.C. 154(b) by 790 days.

(21) Appl. No.: 11/382,112

(22) Filed: May 8, 2006

(65) Prior Publication Data

US 2007/0005172 A1    Jan. 4, 2007

(30) Foreign Application Priority Data

Jun. 30, 2005    (DE) .................. 10 2005 030 586

(51) Int. Cl.
    G06F 19/00    (2006.01)
(52) U.S. Cl. .................................. 700/109
(58) Field of Classification Search .......... 700/29, 700/31, 32, 55, 108, 121, 95, 109, 110; 702/81, 702/83–85, 182–184; 438/5, 14
    See application file for complete search history.

(56) References Cited

U.S. PATENT DOCUMENTS

| | | | |
|---|---|---|---|
| 6,161,054 A | 12/2000 | Rosenthal et al. | 700/121 |
| 6,248,602 B1 | 6/2001 | Bode et al. | 438/14 |
| 6,333,786 B1 | 12/2001 | Uzawa et al. | 700/121 |
| 6,346,426 B1 | 2/2002 | Toprac et al. | 438/8 |
| 6,615,101 B1 | 9/2003 | Nicholson et al. | 700/108 |
| 6,640,151 B1 | 10/2003 | Somekh et al. | 700/121 |
| 6,654,698 B2 | 11/2003 | Nulman | 702/85 |
| 6,675,135 B1 | 1/2004 | Murray et al. | 700/109 |
| 6,738,682 B1 * | 5/2004 | Pasadyn | 700/100 |
| 6,757,579 B1 * | 6/2004 | Pasadyn | 700/108 |
| 6,836,691 B1 | 12/2004 | Stirton | 700/108 |
| 6,898,471 B1 | 5/2005 | Sun et al. | 700/90 |
| 6,928,628 B2 | 8/2005 | Seligson et al. | 438/14 |
| 6,988,017 B2 * | 1/2006 | Pasadyn et al. | 700/121 |
| 7,127,304 B1 * | 10/2006 | Gould et al. | 700/20 |
| 7,127,316 B2 | 10/2006 | Hsu et al. | 700/109 |
| 7,180,443 B1 * | 2/2007 | Mookerjee et al. | 342/195 |

(Continued)

FOREIGN PATENT DOCUMENTS

DE    199 02 795 A1    8/2000

(Continued)

OTHER PUBLICATIONS

Edgar et al.; "Model-Based Control in Microelectronic Manufactruing"; Dec. 1999; IEEE pp. 4185-4191.*

(Continued)

*Primary Examiner*—Albert DeCady
*Assistant Examiner*—Chad Rapp
(74) *Attorney, Agent, or Firm*—Williams, Morgan & Amerson, P.C.

(57) ABSTRACT

By taking into consideration the measurement uncertainties in the form of standard errors, the performance of APC controllers may be efficiently enhanced by using the standard errors as a control input. For example, the filter parameter of an EWMA filter may be efficiently scaled on the basis of a standard error of measurement data.

22 Claims, 1 Drawing Sheet

U.S. PATENT DOCUMENTS

| | | | |
|---|---|---|---|
| 7,181,354 B1 | 2/2007 | Bone et al. | 702/84 |
| 7,289,864 B2 * | 10/2007 | Horak et al. | 700/121 |
| 7,349,753 B2 * | 3/2008 | Paik | 700/110 |
| 7,689,028 B2 | 3/2010 | Sakano et al. | 700/108 |
| 7,738,986 B2 | 6/2010 | Stirton et al. | 700/109 |
| 2005/0071039 A1 * | 3/2005 | Mitrovic | 700/121 |
| 2006/0015206 A1 | 1/2006 | Funk et al. | 700/121 |
| 2006/0129257 A1 | 6/2006 | Chen et al. | 700/96 |
| 2006/0184264 A1 * | 8/2006 | Willis et al. | 700/108 |
| 2007/0005172 A1 | 1/2007 | Malig et al. | 700/108 |
| 2007/0238201 A1 | 10/2007 | Funk et al. | 438/14 |

FOREIGN PATENT DOCUMENTS

| | | |
|---|---|---|
| DE | 101 60 961 A1 | 6/2003 |
| DE | 102 19 363 A1 | 11/2003 |
| DE | 698 11 742 T2 | 12/2003 |
| DE | 601 04 705 T2 | 9/2005 |
| EP | 1 420 314 A2 | 11/2003 |
| WO | WO 03/023538 A2 | 3/2003 |

OTHER PUBLICATIONS

Qin et al.; "Semicondcutro Mnaufactruing Process Control and Monitroing: A Fab-Wide Framework"; Jun. 2, 2005; Elseviee; pp. 179-191.*

Smith et al. ; "Run by Run Advnaced Process Control of Metal Sputter Deposition"; May 1998, ; IEEE; vol. 11; No. 2; pp. 276-284.*

Ciccarella et al.; "Mutiple Processor Architectures for Real Time Parameter Estimation"; 1989; IEEE; pp. 93-100.*

Mortazavian, H.; "Supervisory Control with Patrial Information on Controlablity and Observability"; 1993; IEEE; pp. 348-351.*

Zoretto et al.; "Process Modeling Develpoment Through Artifial Neurl Networks and Hybrid Models"; 200; Elsevier; pp. 1355-1360.* van der Veen; "Error analysis in the evaluation of measurement uncertainty"; Apr. 1, 2003; IOPscience; pp. 42-50.*

Notice of Allowance dated May 17, 2010 from related U.S. Appl. No. 11/420,625.

* cited by examiner

METHOD AND SYSTEM FOR ADVANCED PROCESS CONTROL USING MEASUREMENT UNCERTAINTY AS CONTROL INPUT

BACKGROUND OF THE INVENTION

1. Field of the Invention

The present invention relates to the field of fabricating semiconductor devices, and, in particular, to advanced process control (APC) techniques for manufacturing processes, wherein an improved process control quality is achieved by adjusting process parameters in a predictive manner on the basis of a process model and measurement data.

2. Description of the Related Art

Today's global market forces manufacturers of mass products to offer high quality products at a low price. It is thus important to improve yield and process efficiency to minimize production costs. This is especially true in the field of semiconductor fabrication where it is essential to combine cutting edge technology with mass production techniques. It is, therefore, the goal of semiconductor manufacturers to reduce the consumption of raw materials and consumables while at the same time improve product quality and process tool utilization. The latter aspect is especially important since the equipment used in modern semiconductor facilities is extremely cost intensive and represents the dominant part of the total product costs. For example, in manufacturing modern integrated circuits, 500 or more individual processes may be necessary to complete the integrated circuit, wherein failure in a single process step may result in a loss of the complete integrated circuit. This problem is exacerbated when the size of substrates, on which a plurality of such integrated circuits are processed, steadily increases, so that failure in a single process step may entail the loss of a large number of products.

Therefore, the various manufacturing stages have to be thoroughly monitored to avoid undue waste of manpower, tool operation time and raw materials. Ideally, the effect of each individual process step on each substrate would be detected by measurement and the substrate under consideration would be released for further processing only if the required specifications were met. A corresponding process control, however, is not practical, since measuring the effects of certain processes may require relatively long measurement times, frequently ex situ, or may even necessitate the destruction of the sample. Moreover, immense effort, in terms of time and equipment, would have to be made on the metrology side to provide the required measurement results. Additionally, utilization of the process tool would be minimized since the tool would be released only after the provision of the measurement result and its assessment.

The introduction of statistical methods, also referred to as statistical process control (SPC), for adjusting process parameters significantly relaxes the above problem and allows a moderately high utilization of the process tools while attaining a relatively high product yield. Statistical process control is based on the monitoring of the process output to thereby identify an out-of-control situation, wherein a causal relationship is established to an external disturbance. After occurrence of an out-of-control situation, operator interaction is usually required to manipulate a process parameter so as to return to an in-control situation, wherein the causal relationship may be helpful in selecting an appropriate control action. Nevertheless, in total, a large number of dummy substrates or pilot substrates may be necessary to adjust process parameters of respective process tools, wherein tolerable parameter drifts during the process have to be taken into consideration when designing a process sequence, since such parameter drifts may remain undetected over a long time period or may not be efficiently compensated for by SPC techniques.

Recently, a process control strategy has been introduced, and is continuously improving, allowing a high degree of process control, desirably on a run-to-run basis, with a moderate amount of measurement data. In this control strategy, so-called advanced process control (APC), a model of a process or of a group of interrelated processes is established and implemented in an appropriately configured process controller. The process controller also receives information including pre-process measurement data and/or post-process measurement data, as well as information related to, for instance, the substrate history, such as type of process or processes, the product type, the process tool or process tools in which the products are to be processed or have been processed in previous steps, the process recipe to be used, i.e., a set of required steps for the process or processes under consideration, wherein possibly fixed process parameters and variable process parameters may be contained, and the like. From this information and the process model, the process controller determines a controller state or process state that describes the effect of the process or processes under consideration on the specific product, thereby permitting the establishment of an appropriate parameter setting of the variable parameters of the specified process recipe to be performed with the substrate under consideration.

Thus, the APC controller may have a predictive behavior, whose accuracy may depend on the amount of measurement data and the delay with respect to the current process run. The measurement data, however, may stem from different process tools performing equivalent processes, and/or only dedicated wafers or wafer sites may be subjected to measurement, thereby creating a certain amount of uncertainty, which may render the measurement data and any predicted process states derived therefrom less reliable.

In view of the situation described above, there exists a need for a technique that enables an enhanced control strategy, wherein one or more of the problems identified above may be avoided or the effects thereof at least be significantly reduced.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

Generally, the present invention is directed to a technique that provides enhanced control efficiency for one or more process tools operated according to an APC regime, in which measurement data and a model of a manufacturing process including at least one of the process tools are used to generate one or more updated values for the manipulated variables corresponding to the tool parameters to be controlled. For this purpose, the uncertainty associated with the measurement data may be used as an input for the control scheme in order to assess the "quality" or "reliability" of the measurement data and the corresponding values of the manipulated variables or the process state determined therefrom. Consequently, the accuracy of the control operation may be enhanced, as not only the measurement data per se are employed for calculating updated manipulated variables, but also the variance of the measurement data may be directly taken into consideration by the control algorithm.

According to one illustrative embodiment of the present invention, a method comprises estimating a current process state of a manufacturing process based on metrology data obtained from a previously performed process run and related to an output of the manufacturing process, wherein the estimation is based on a model of at least a part of the manufacturing process and on an uncertainty of the metrology data.

According to another illustrative embodiment of the present invention, a method comprises determining an updated value for one or more manipulated variables of a manufacturing process on the basis of measurement data and a control algorithm. The method further comprises weighting the updated value on the basis of a standard error determined from one or more mean values of the measurement data.

In accordance with yet another illustrative embodiment of the present invention, a control system comprises an input section configured to receive measurement data related to a process output of a process tool to be controlled. The system further comprises an error calculating section that is configured to determine a standard error of one or more mean values of the measurement data. Finally, the system comprises a model-based control section configured to determine an updated value of at least one manipulated variable for the process tool on the basis of the model, the measurement data and the standard error.

BRIEF DESCRIPTION OF THE DRAWINGS

The invention may be understood by reference to the following description taken in conjunction with the accompanying drawings, in which like reference numerals identify like elements, and in which.

Figure 1:
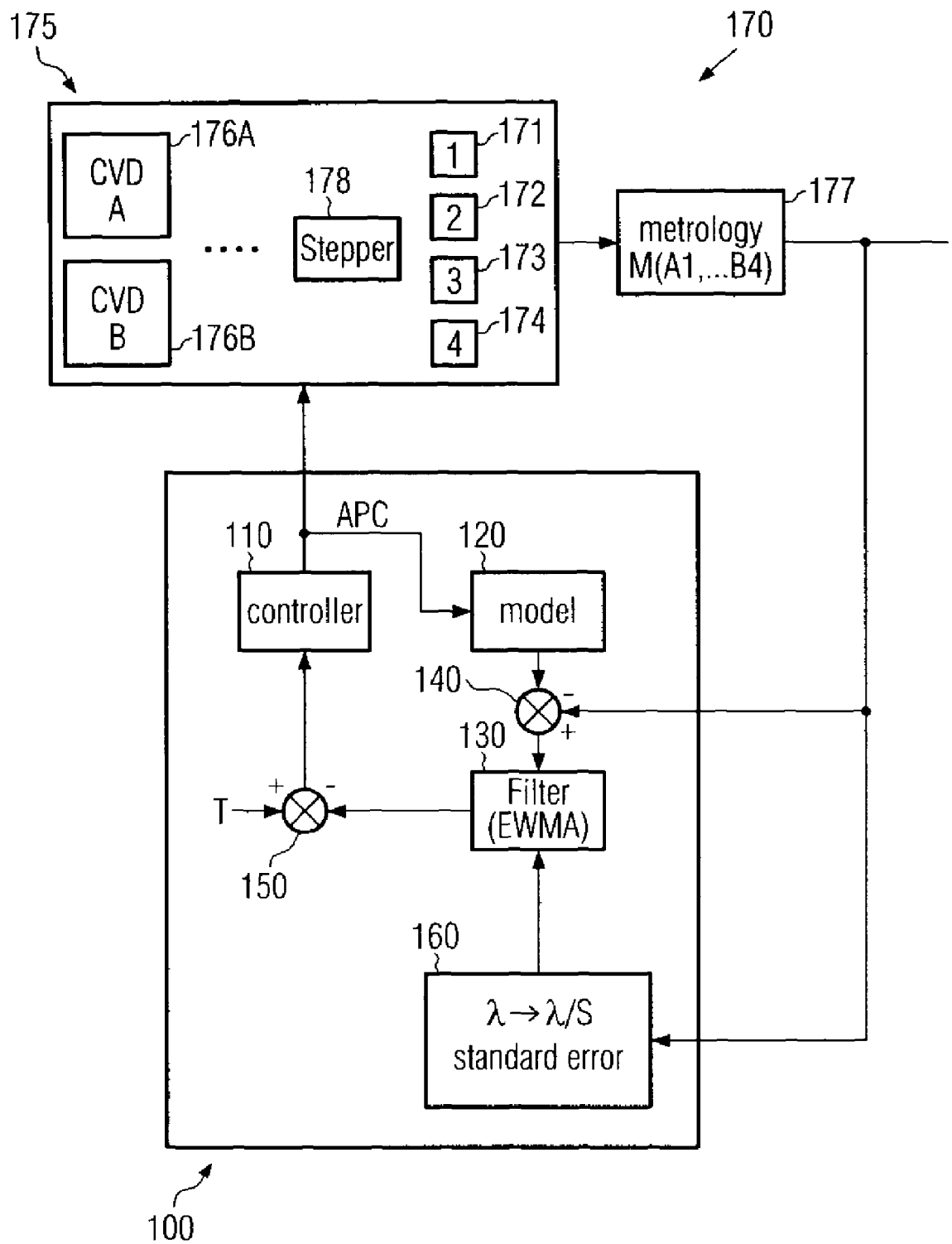
FIG. 1 schematically illustrates an APC control system applied to a manufacturing environment in accordance with illustrative embodiments of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Generally, the present invention is directed to model-based control strategies in which the control state, i.e., the state of the various manipulated variables of one or more process tools to be controlled, is determined on the basis of measurement data that represents the effect of a manufacturing process performed by the one or more process tools to be controlled. In some configurations, one or more further process tools may be involved, which may not be directly subjected to the control process. In this connection, a manipulated variable or a controlled variable is to be understood to be a process parameter of a process recipe, the value of which may be adjusted to obtain a certain effect on one or more control variables, which may represent an output characteristic of the process or process sequence under consideration, wherein the output characteristic may be determined on the basis of measurements. As previously explained, during realistic production conditions in a semiconductor facility, measurements may be obtained from a limited number of substrates or substrate sites only, owing to throughput and cost considerations, thereby imparting an increased uncertainty to these measurement results. For example, a first contribution to the measurement uncertainty may be caused by the measurement process itself, as, for instance, metrology tool-induced variations, environmental influences, sample preparation and the like may significantly affect the measurement process. On the other hand, the specific selection of the measurement samples, and particularly the number thereof, may also have a significant influence on the uncertainty of the measurement data with respect to a "true" process output.

Contrary to conventional approaches, the present invention provides a technique that explicitly takes into consideration the uncertainty of the measurement data in calculating an updated process state for one or more process tools to be controlled for a subsequent run of the specified manufacturing process. In some particular embodiments, the explicit consideration of the measurement uncertainty may be accomplished by estimating a metric for the "confidence" in the measurement, wherein any process states calculated on the basis of measurement data having the higher degree of confidence may be weighted stronger than process states obtained on the basis of measurement data having the lower degree of confidence. A corresponding weighting of process state estimations on the basis of the level of confidence of the measurement data may also be advantageous in situations in which a plurality of process steps may be involved, which are typically performed by a plurality of equivalent process tools, where these equivalent process tools may exhibit a different tool drift over time. In this respect, it should be appreciated that "equivalent" process tools are to be considered as individual stand-alone process tools, such as different photolithography tools, etch tools, deposition tools, chemical mechanical polishing (CMP) tools, and the like, or equivalent process tools may also be considered as different modules or process chambers performing the same process recipe which, however, may be integrated in one single device. For example, a CMP tool having a plurality of CMP stations performing the same process recipe may be considered as different equivalent process tools in the above-specified sense. In principle, various wafers passing through a process flow sequence including at least one process tool to be controlled, such as for instance a photolithography tool, may produce various categories of measurement data, which may stem from the different branches of the process sequence under consideration. That is, wafers processed using a specified combination of tools for pre- and post-exposure processes may produce a specified set of measurement data, the uncertainty of which may significantly be determined by the specific process flow branch. Performing the control of the photolithography tool on the basis of each individual branch may, however, result in a decreased control performance, since the amount of available measurement data for this specific branch may be quite limited, thereby possibly additionally increasing the measurement uncertainty. In this case, explicitly considering the uncertainty associated with the respective set of measurement data may enable an enhanced process control strategy, since the "reliability" of the available set of measurement data may be known in advance and may therefore be taken into consideration when establishing updated process states. In one illustrative embodiment, a mean bias, that is, a difference in bias, of two or more process tools involved in the above process flow sequence may be determined, along with a corresponding confidence metric which quantitatively specifies the degree of confidence associated with the determined difference in tool bias, so that, based on the mean tool bias and the corresponding confidence metric, an updated version of the process state for the process tool to be controlled may be established, wherein now an increased amount or all of the measurement data may be used, thereby enhancing control performance in terms of control accuracy.

With reference to FIG. 1, further illustrative embodiments of the present invention will now be described in more detail. FIG. 1 schematically shows a control system 100, which is associated with a manufacturing environment 170, to control one or more process tools contained therein. The manufacturing environment 170 may comprise a plurality of process tools 175, which may be considered as a functional unit for performing a specified sequence of process steps in order to produce a certain process output. For example, the plurality of process tools 175 may comprise deposition tools, implantation tools, etch tools, CMP tools, photolithography tools, or any combination thereof, and the like, through which a plurality of substrates are processed in a specified sequence. By way of example, a manufacturing process in accordance with the present invention may represent a process performed by a single tool, such as a deposition tool forming a copper-based metal onto a dielectric layer having formed therein trenches and vias. A subsequent process step for completing a metallization layer may be a CMP tool that is operated to remove any excess copper-based material. In advanced process control strategies, these process steps may be considered as interrelated processes, wherein each of the processes may be controlled on the basis of measurement data obtained from each of the processes. That is, the deposition profile obtained from the deposition tool may significantly influence the process output of the CMP tool due to an intrinsic non-uniformity of the deposition process and the CMP process. Consequently, a plurality of measurement data may be available, in particular if two or more equivalent process tools for one or more of the above process steps are provided. By controlling, for instance, the deposition tool on the basis of the process output that is also substantially affected by the CMP process, an additional confidence metric for evaluating the uncertainty may therefore allow an appropriate adaptation of the updated manipulated variables used for controlling the deposition tool. Thus, the available measurement data may be used more efficiently by contemplating the uncertainty associated therewith, as will be described later on in more detail. It should be appreciated that the above-described process sequence is of illustrative nature only, and other functionally related process sequences may also be controlled on the basis of measurement uncertainty entered into the control algorithm.

In the illustrative embodiment shown, the manufacturing environment 170 may comprise the plurality of process tools 175 as a functional block including, for instance, a plurality of chemical vapor deposition (CVD) tools 176a, 176b, which may, for instance, be configured to provide a specific material layer on a plurality of substrates. For example, the CVD tools 176a, 176b may be configured to deposit an anti-reflective coating (ARC) layer that is formed in accordance with a specified process recipe so as to endow the specific material layer with optical characteristics required for a specified exposure process to be performed by one or more photolithography tools 178. In this respect, the CVD tools 176a, 176b may be considered as "equivalent" process tools as these tools operate in accordance with the same process recipe, at least for a specified plurality of substrates. Moreover, the plurality of process tools 175 may comprise any other pre-exposure tools, such as resist coating tools, pre-exposure bake tools and the like. For convenience, any such process tools are not shown. Furthermore, the plurality of process tools 175 may comprise post-exposure process tools, such as post-exposure bake (PEB) tools 171, 172, 173 and 174, which may also be considered as equivalent process tools. It should be appreciated that other post-exposure process tools may be provided, such as developer tools and the like, which may produce resist features that may be used for patterning, for instance, gate electrode structures and the like.

The manufacturing environment 170 further comprises a metrology tool 177, which may also be comprised of a plurality of equivalent tools, depending on the measurement process to be performed. For example, the metrology tool 177 may represent an optical layer thickness measurement tool, which may determine a thickness of the exposed resist layer as provided by the PEB tools 171, 172, 173, 174. In other cases, the metrology tool 177 may represent an inspection instrument that is configured to estimate a critical dimension of resist features obtained after the development of the exposed resist layer. The metrology tool 177 is configured to provide measurement data on the basis of a specific sample length, that is, a specific number of measurements performed on one or more substrates having passed through the plurality of process tools 175. With respect to the embodiment shown, the measurement data may be indicated as M (A1, . . . B4) representing different sets of measurement data corresponding to the different branches that a substrate may take when being processed by the process tools 175. That is, a certain number of measurements are taken from samples having passed the CVD tool 176a and finally processed by one of the PEB tools 171, 172, 173, 174. Similarly, a certain number of measurements are obtained for each of the branches associated with the CVD tool 176b and the respective PEB tools 171, 172, 173 174. For convenience, it is assumed that the metrology tool 177 does not comprise a plurality of individual tools and thus does not add further branches of the process flow under consideration.

The control system 100 may further comprise an input section 140, which is configured to receive the measurement data M (A1, . . . B4) from the metrology tool 177 or any other instance, such as a supervising manufacturing execution system, as is typically provided in semiconductor facilities. The input section 140 may further be configured to receive a process state from a model section 120, which in turn is configured to estimate an updated process state of one or more of the process tools 175, which is to be controlled by the system 100. For example, the model section 120 may comprise an algorithm for predicting a process output of the plurality of process tools 175, for instance a layer thickness of an exposed resist layer, a critical dimension of a resist feature and the like, to provide a prediction for the actual process output, of which the measurements M (A1, . . . B4) supplied by the metrology tool 177 represent a "delayed" version from a previously performed process run. For example, the model section 120 may have implemented therein a model that is linearly dependent on one or more manipulated variables used for controlling one or more of the plurality of process tools 175.

The control system 100 further comprises a controller section 110, which is configured to determine one or more updated manipulated variables, such as exposure dose, exposure time and the like, when the process tool to be controlled is the photolithography tool 178. For this purpose, the controller section 110 may comprise a specified control law, which may be considered as an algorithm for calculating updated manipulated variables on the basis of a target value for the process output, i.e., the control variable, and a difference of the predicted process output and the measurement data M (A1, . . . B4). To this end, the controller section 110 may be connected to a module 150, which receives the target value of the process output and the difference of the predicted process output and the actual measurement values M (A1, . . . B4), which may be supplied by a filter section 130 that is configured to operate on the predicted process output provided by the model section 120 and the measurement data M (A1, . . . B4) provided by the metrology tool 177. In one illustrative embodiment, the filter section 130 may have implemented therein an exponentially weighted moving average (EWMA) filter, which in principle provides an updated error estimate, i.e., a discrepancy between the predicted process output and the observed process output, on the basis of all preceding error estimates, which are weighted on the basis of a scaling factor, usually referred to as λ. Hence, the EWMA filter 130 may provide an error estimation $\hat{c}_k$ to be currently used on the basis of Equation 1:

$$\hat{c}_k = \lambda c_k + (1-\lambda)\hat{c}_{k-1} \quad (1)$$

where $c_k$ represents the measurement data M in an appropriate format.

As may be seen from Equation 1, the currently used error estimation $\hat{c}_k$ includes the controller history as well as the measurement data M (A1, . . . B4), wherein the value of λ, which is to be selected in the range of [0,1], significantly determines the controller behavior, as the value of λ determines the "strength" with which the process history influences the currently generated process state.

The control system 100 further comprises an error calculating section 160, which is configured to receive the measurement data M (A1, . . . B4) and to provide an updated filter parameter that is modified on the basis of an uncertainty associated with the measurement data M (A1, . . . B4). In one illustrative embodiment, the error calculating section 160 may be configured to calculate a standard error "s" for at least some sets of the measurement data M (A1, . . . B4) as a measure of measurement uncertainty and as means for modifying one or more filter parameters.

During operation of the control system 100, the error calculation section 160 may calculate the standard error "s" according to Equation 2:

$$s = \frac{\sigma}{\sqrt{N}} \quad (2)$$

where σ represents the true standard deviation and N the number of measurements belonging to a set of measurements under consideration.

On the basis of the standard error "s," a currently appropriate value for the filter parameter λ may be established, wherein, for example, a high value of the standard error "s" in the most recent measurement data may indicate a high uncertainty so that an appropriate value for λ may be selected according to Equation 1 so as to explicitly take into consideration the specific standard error "s." For example, if the most recent measurement data exhibits a high value of the standard error "s" owing to, for instance, an unstable behavior of one of the tools 175, λ may be re-scaled to a moderately small value, thereby reducing the influence of the most recent measurement on the current error estimation $\hat{c}_k$. Thus, the overall performance of the control system 100 may be improved with respect to any disturbances of short duration, since the effect of the disturbance after its end on the further controller behavior may be significantly reduced by taking into consideration the measurement uncertainty associated with the process disturbance, for instance, by re-scaling λ.

In other embodiments, the metrology data supplied by the metrology tool 177 may include data sets corresponding to the various branches indicated as A1, . . . B4, wherein each measurement set may thus have associated therewith its respective uncertainty or standard error. When using the measurement data M (A1, . . . B4) in its entirety, it may be advantageous to determine a mean bias of equivalent process tools, such as, for instance, of the CVD tools 176a, 176b. Thus, for each combination, there is a respective number of measurements, i.e., a set of measurements A1, A2, . . . B4 which may define a respective mean value $m_{A1}, \ldots m_{B4}$ and a standard deviation $\sigma_{A1}, \ldots \sigma_{B4}$ for the respective entire population. If, for instance, one of the PEB tools 171, 172, 173, 174 operates differently from the other tools, owing to, for instance, a degraded uniformity or temperature control, the corresponding standard deviation $\sigma_{A1}, \ldots \sigma_{B4}$ for this specific tool may be higher. Since the respective standard deviations $\sigma_{A1}, \ldots \sigma_{B4}$ may not be equal for all of the combinations of the process tools 176a, 176b, 171, 172, 173, 174, the homogeneity of variances, as is required for standard ANOVA (analysis of variants) analysis is not satisfied.

According to the present invention, a mean bias $\Delta_1, \ldots \Delta_4$, for instance with respect to the CVD tools 176a, 176b, may be determined on the basis of, for instance, the measurement data M (A1, . . . B4) obtained from one lot of substrates, by calculating the bias of the tools 176a, 176b for each of the branches represented by the various equivalent process tools 171, 172, 173, 174. Thus, as each combination of one of the tools 176a, 176b and the tools 171, 172, 173, 174 has its own standard error $s_{A1}; \ldots s_{A4}$ and a corresponding mean value $m_{A1}, \ldots m_{B4}$ for the process output presented by the measurement data, the corresponding biases may be calculated in the following way:

$$\Delta_1 = m_{A1} - m_{B1} \tag{3}$$

$$\Delta_2 = m_{A2} - m_{B2}$$

$$\Delta_3 = m_{A3} - m_{B3}$$

$$\Delta_4 = m_{A4} - m_{B4}$$

$$s_{\Delta 1} = \sqrt{s_{A1}^2 + s_{B1}^2} = \sqrt{\frac{\sigma_{A1}^2}{N_{A1}} + \frac{\sigma_{B1}^2}{N_{B1}}}$$

$$s_{\Delta 2} = \sqrt{s_{A2}^2 + s_{B2}^2} = \sqrt{\frac{\sigma_{A2}^2}{N_{A2}} + \frac{\sigma_{B2}^2}{N_{B2}}}$$

$$s_{\Delta 3} = \sqrt{s_{A3}^2 + s_{B3}^2} = \sqrt{\frac{\sigma_{A3}^2}{N_{A3}} + \frac{\sigma_{B3}^2}{N_{B3}}}$$

$$s_{\Delta 4} = \sqrt{s_{A4}^2 + s_{B4}^2} = \sqrt{\frac{\sigma_{A4}^2}{N_{A4}} + \frac{\sigma_{B4}^2}{N_{B4}}}$$

Based on the individual biases $\Delta_1 \ldots \Delta_4$, a "consensus" mean bias $\overline{\Delta}$ may be determined, which, is in one embodiment, to be accomplished by weighting the individual biases $\Delta_1 \ldots \Delta_4$ by the reciprocals of the respective standard errors $s_{\Delta 1}; \ldots s_{\Delta 4}$ according to Equation 4:

$$\overline{\Delta} = \left( \frac{1}{s_{\Delta 1}} \Delta_1 + \frac{1}{s_{\Delta 2}} \Delta_2 + \frac{1}{s_{\Delta 3}} \Delta_3 + \frac{1}{s_{\Delta 4}} \Delta_4 \right) / \left( \frac{1}{s_{\Delta 1}} + \frac{1}{s_{\Delta 2}} + \frac{1}{s_{\Delta 3}} + \frac{1}{s_{\Delta 4}} \right) \tag{4}$$

The consensus mean bias $\overline{\Delta}$ is associated with a corresponding standard error $s_{\overline{\Delta}}$ according to Equation 5:

$$s_{\overline{\Delta}} = \frac{4}{\frac{1}{s_{\Delta 1}} + \frac{1}{s_{\Delta 2}} + \frac{1}{s_{\Delta 3}} + \frac{1}{s_{\Delta 4}}} \tag{5}$$

The standard error $s_{\overline{\Delta}}$ of the consensus mean bias $\overline{\Delta}$ may be used as a metric for the confidence that may be seen in the consensus mean bias $\overline{\Delta}$. That is, the standard error $s_{\overline{\Delta}}$ of the consensus mean bias $\overline{\Delta}$ may be considered as a metric of a "confidence interval," although conventionally a confidence interval may require the usage of the so-called t-statistic typically used in statistical calculations for process control. Consequently, the lower the value of the standard error $s_{\overline{\Delta}}$ of the consensus mean bias $\overline{\Delta}$, the more confidence one may have in the consensus mean bias $\overline{\Delta}$. It is evident that the confidence increases as the individual standard deviations $\sigma_{A1} \ldots \sigma_{B4}$ decrease and the individual $N_{A1}, \ldots N_{B4}$ increase. Thus, the standard error $s_{\overline{\Delta}}$ of the consensus mean bias $\overline{\Delta}$ may be efficiently used to re-adjust one or more parameters of the filter 130, thereby providing an excellent weighting factor for enhancing control performance even for complex measurement data structures, such as the data structure M (A1, ... B4). In one illustrative embodiment, the reciprocal of the standard error $s_{\overline{\Delta}}$ of the consensus mean bias $\overline{\Delta}$ may be used to appropriately scale $\lambda$ of the EWMA filter, wherein the scaling operation is performed such that $\lambda$ remains in the interval [0,1] as is required according to Equation 1. Since the standard error $s_{\overline{\Delta}}$ may be unbounded, for this purpose the resulting value for the re-scaled $\lambda$ may be "clipped" at a user-defined maximum allowed $\lambda$ that is equal to or less than one. In other embodiments an appropriate function may be defined that maps the standard error $s_{\overline{\Delta}}$ into the interval [0,1], thereby ensuring the above condition for $\lambda$ when the function is used as a weighting factor.

In a further embodiment, $\lambda$ may be scaled by using some "reference states" as a basis. For example, a "nominal $\lambda_0$" may be defined that should be the result if some specific variance and number of wafers is used, for example variance 1 and one wafer. Then, one obtains for the scaled $\lambda$:

$$\lambda = \lambda_0 + (1 - \lambda_0)(s_{\Delta 0} - s_\Delta)/s_{\Delta 0} \tag{6}$$

where $s_{\Delta 0}$ is the standard error of the reference situation, e.g., historical population variance of 1, one wafer sampled, etc.

Thus, $\lambda$ will asymptotically approach 1 as the standard error $s_\Delta$ to 0, and will go to zero as the standard error $s_\Delta$ increases without bound. One can also substitute some $\lambda_{max} > 1$, so:

$$\lambda = \lambda_0 + (\lambda_{max} - \lambda_0)(s_{\Delta 0} - s_\Delta)/s_{\Delta 0} \tag{7}$$

such that $\lambda$ asymptotically approaches $\lambda_{max}$ as the standard error goes to zero.

This has the added advantage of being a linear transform of the standard error, so the property of ever-decreasing slope (diminishing returns) as a function of the number of wafers N is preserved.

As a result, the present invention provides a technique for enhancing control performance by taking into consideration the uncertainty of measurement data which is used to calculate updated values of manipulated variables and process states. The uncertainty of measurement data may be calculated in the form of standard errors of mean values of the measurement data, which may then be used for weighting the estimated process states in an appropriate manner. For example, in an EWMA filter, the filter parameter $\lambda$ may be scaled on the basis of the standard error. Moreover, in complex measurement data structures relating to a plurality of branches, a consensus mean bias may be calculated on the basis of the individual standard errors of the respective measurement branches, wherein the standard error of the consensus mean bias may then also be used to efficiently scale or re-adjust the filter parameter of the EWMA filter.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method, comprising:
    estimating using a computing device a current process state of a manufacturing process performed by a plurality of equivalent process tools for performing fabrication processes to manufacture items in a process flow based on metrology data obtained from a previously performed process run and related to an output of said manufacturing process, said estimating being based on a model of at least a part of said manufacturing process and based on an uncertainty of said metrology data, wherein said uncertainty of said metrology data is determined by determining in said computing device biases between at least a subset of the equivalent tools prior to estimating said current process state, said biases quantifying deviations of said output reflected in said metrology data.

2. The method of claim 1, further comprising determining one or more mean bias values of measurements related to at least some of the plurality of equivalent tools, determining a standard error of said one or more mean values, and using said standard error as a confidence metric for weighting said estimated process state.

3. The method of claim 2, further comprising determining a consensus mean bias for said plurality of equivalent tools from said one or more mean values and respective standard errors associated with said one or more mean values.

4. The method of claim 3, wherein determining said consensus mean bias comprises calculating a bias for each of the equivalent tools based on measurement data associated with a respective process tool and weighting each bias by the reciprocal of the standard error associated with said mean value associated with said respective equivalent tool.

5. The method of claim 1, wherein said process model comprises an EWMA (exponentially weighted moving average) filter.

6. The method of claim 5, further comprising scaling said EWMA filter on the basis of said uncertainty.

7. The method of claim 6, wherein said EWMA filter is scaled by using a scaling function relating the filter parameter of the EWMA filter to a reference filter parameter, said scaling function being defined to maintain said filter parameter within a range from zero to one.

8. The method of claim 5, further comprising determining one or more mean values of measurements related to at least some of the plurality of equivalent tools, determining a standard error of said one or more mean values, and weighting said EWMA filter by the reciprocal of said standard error.

9. The method of claim 8, wherein weighting said EWMA filter comprises adjusting a value of the filter parameter of said EWMA filter under a condition that said value remains between zero and one.

10. A method comprising:
determining using a computing device an updated value for one or more manipulated variables of a manufacturing process on the basis of measurement data of an output of said manufacturing process and a control algorithm; and
weighting said updated value in said computing device on the basis of a standard error determined from one or more mean values of said measurement data determined based on biases between equivalent process tools used in performing the manufacturing process, said biases quantifying deviations of said output between at least a subset of said equivalent process tools reflected in said measurement data.

11. The method of claim 10, wherein said control algorithm comprises an EWMA (exponentially weighted moving average) filter.

12. The method of claim 11, further comprising scaling said EWMA filter on the basis of said standard error.

13. The method of claim 12, wherein said EWMA filter is scaled by using a scaling function relating the filter parameter of the EWMA filter to a reference filter parameter, said scaling function being defined to maintain said filter parameter within a range from zero to one.

14. The method of claim 13, wherein said scaling function is a linear function with respect to said standard error.

15. The method of claim 12, wherein said EWMA filter is scaled by weighting a filter parameter of said EWMA filter by applying the reciprocal of said standard error.

16. The method of claim 15, wherein weighting said EWMA filter comprises adjusting a value of the filter parameter of said EWMA filter under a condition that said value remains between zero and one.

17. The method of claim 10, further comprising determining one or more mean bias values of said measurement data related to at least some of the plurality of equivalent tools, determining a standard error of said one or more mean values and using said standard error as a confidence metric for weighting said updated value.

18. The method of claim 17, wherein determining said confidence metric comprises determining a consensus mean bias for said plurality of equivalent tools from said one or more mean bias values and respective standard errors associated with said one or more mean bias values.

19. The method of claim 18, wherein determining said consensus mean bias comprises weighting each mean bias by the reciprocal of the standard error associated with said mean bias value associated with said respective equivalent tool.

20. A control system, comprising:
an input section configured to receive measurement data related to a process output of a process tool to be controlled;
an error calculating section implemented by a computing device configured to determine a standard error of one or more mean bias values quantifying deviations of said process output reflected in said measurement data determined between the process tool and at least one equivalent process tool; and
a model-based control section implemented by said computing device configured to determine at least one updated manipulated variable for said process tool on the basis of said model, said measurement data and said standard error.

21. The control system of claim 20, wherein said model-based control section comprises an EWMA (exponentially weighted moving average) module.

22. The control system of claim 21, wherein said model-based control section is further configured to adjust a filter parameter of said EWMA filter on the basis of said standard error.

* * * * *